United States Patent
Lampman et al.

(10) Patent No.: US 11,633,941 B2
(45) Date of Patent: Apr. 25, 2023

(54) SYMMETRIC GLAZING FOR IMPROVED SOUND ATTENUATION

(71) Applicants: DeWitt Lampman, Allison Park, PA (US); Michael Ulizio, Pittsburgh, PA (US)

(72) Inventors: DeWitt Lampman, Allison Park, PA (US); Michael Ulizio, Pittsburgh, PA (US)

(73) Assignee: Pittsburgh Glass Works, LLC, Pittsburgh, PA (US)

( * ) Notice: Subject to any disclaimer, the term of this patent is extended or adjusted under 35 U.S.C. 154(b) by 0 days.

(21) Appl. No.: 15/876,775

(22) Filed: Jan. 22, 2018

(65) Prior Publication Data

US 2018/0207923 A1 Jul. 26, 2018

Related U.S. Application Data

(60) Provisional application No. 62/448,657, filed on Jan. 20, 2017.

(51) Int. Cl.
| | |
|---|---|
| *B32B 17/10* | (2006.01) |
| *C03C 17/36* | (2006.01) |
| *B32B 37/10* | (2006.01) |
| *B32B 37/18* | (2006.01) |

(52) U.S. Cl.
CPC .. *B32B 17/10917* (2013.01); *B32B 17/10036* (2013.01); *B32B 17/10559* (2013.01); *B32B 17/10752* (2013.01); *B32B 17/10761* (2013.01); *B32B 17/10779* (2013.01); *B32B 37/10* (2013.01); *B32B 37/182* (2013.01); *C03C 17/3681* (2013.01); *B32B 2605/006* (2013.01)

(58) Field of Classification Search
CPC ........ B32B 17/10917; B32B 17/10036; B32B 17/10559; B32B 17/10752; B32B 17/10761; B32B 17/10779; B32B 17/10009; B32B 7/02; B32B 37/10; B32B 37/182; B32B 2605/006; B32B 2250/03; C03C 17/3681
See application file for complete search history.

(56) References Cited

U.S. PATENT DOCUMENTS

| | | | | |
|---|---|---|---|---|
| 2012/0328843 A1* | 12/2012 | Cleary | .............. | B32B 17/10036 428/174 |
| 2015/0140301 A1* | 5/2015 | Fisher | .............. | B32B 17/10036 428/215 |

\* cited by examiner

*Primary Examiner* — S. Behrooz Ghorishi
(74) *Attorney, Agent, or Firm* — Dentons Cohen & Grigsby P.C.

(57) ABSTRACT

A process for making a symmetrical glazing that has the same nominal weight as an asymmetrical glazing that has been determined to afford enhanced glazing strength, glazing rigidity, or stone impact resistance wherein the symmetric glazing has improved acoustic attenuation over coincidence frequencies of the asymmetric glazing design.

2 Claims, 3 Drawing Sheets

SYMMETRIC GLAZING FOR IMPROVED SOUND ATTENUATION

BACKGROUND OF THE INVENTION

Field of the Invention

The presently disclosed invention is related to window glazings that are suitable for use in automotive applications.

Description of the Prior Art

For many years, automotive vehicles have employed window glazings in which two sheets of glass or other transparent material are bonded together in a heating process with a sheet of light transmissive polymer material that is located between the two glass layers. Typically, the glass is float glass. The polymer is generally selected from a group of materials that includes polyvinyl butyral (PVB) and ethylene vinyl acetate.

More recently, there has been an increasing emphasis on the mileage efficiency of automotive vehicles. The emphasis has been addressed, in part, though reduction of vehicle weight. With respect to automotive glazings, the emphasis has been on weight reduction by decreasing the thickness of the glazing laminate.

In the process of reducing the thickness of automotive glazing laminates, a number of considerations must be addressed. Some of those considerations lead to competing variables in glazing designs. Examples include mechanical rigidity and stability, optical distortion, abrasion resistance, light transmissivity, and cost as well as others. All of these considerations must be reasonably accommodated to have a commercially acceptable automotive glazing.

In the prior art, glass transparencies that were in glazing laminates were generally of the same thickness. However, it has been recognized that one way to decrease the glazing weight while still meeting certain performance requirements would be to reduce the thickness of only one of the glass panels or to reduce the thickness of one glass panel more than the other. A glazing laminate in which one of the glass layers is thinner than the other is referred to herein as an "asymmetric glazing." In contrast, a glazing laminate in which the glass layers have the same nominal thickness is referred to herein as a "symmetric glazing."

With respect to automotive glazings, the greatest potential benefit for weight reduction is with respect to windshields because they represent the largest glazed area in most vehicles. However, advantages for weight reduction with asymmetric glazings also supports application of asymmetric glazings for other automotive glazings besides windshields because competing considerations of mechanical strength and stone impact resistance are less significant for glazings that do not have forward looking orientation in the vehicle. However, cost and other considerations may still support continued use of symmetric glazings, particularly in automotive sidelight and backlight glazings.

In the prior art, sound attenuation has been an important consideration in glazing design. For example, it was known that a "constrained layer effect" in laminated glazings allows laminated glazings to absorb more sound than equivalent weights of monolithic glass. The "constrained layer effect" refers to sound damping by an interlayer that is constrained between two transparencies. The interlayer is comprised of a viscoelastic polymer such as PVB. Sound waves that impact the outer surface of the outer transparency propagate through the outer transparency to the interlayer where they deform the interlayer and cause shear forces therein. Part of the energy of the interlayer shear forces is converted to heat. That energy conversion reduces the mechanical energy of vibrations that are transferred from the interlayer to the inner transparency and, ultimately, the passenger compartment of the vehicle. Thus, the conversion of sound energy to heat results in lower acoustical energy that is transmitted from the glazing to the passenger compartment. In some cases, interlayers with enhanced acoustical properties have been developed so that laminated glazings with such interlayers absorb even more sound than standard polymer interlayers.

It also has been known that glazings with higher mass tend to absorb more sound. However, the increasing emphasis on vehicle weight reduction and a consequent tendency toward lighter (i.e. less massive) glazings has sponsored a general trend toward decreasing sound attenuation in automotive glazings.

Some studies of noise attenuation of lightweight automotive glazings have not identified significant differences in sound attenuation by asymmetric glazings in comparison to symmetric glazings. See Tousignant, T., Govindswamy, K., Bhatia, V., Polasani, S. et al., "Assessment of Lightweight Automotive Glass Solutions on Interior Noise Levels & Sound Quality," *SAE Technical Paper* 2017-01-1814, 2017. However, the importance of sound attenuation has warranted further attempts to identify and optimize glazing sound attenuation characteristics in automotive glazings to support glazing design choices that are more fully informed and efficiently implemented.

SUMMARY OF THE INVENTION

In accordance with the disclosed invention, a process for making lightweight glazings optimizes sound attenuation advantages of symmetric glazings over asymmetric glazings. The disclosed process includes selecting an appropriate lightweight asymmetric glazing that is based on considerations of glazing strength, glazing rigidity, sound attenuation, and stone impact resistance as well as other possible factors. Once the preferred asymmetrical glazing is resolved, the total thickness of the transparencies that are used in the asymmetrical glazing are determined. Thereafter, a laminate stack of unbonded layers of glazing components is prepared by placing a polymer interlayer between an outer transparency sheet and an inner transparency sheet. The thickness of both the outer transparency sheet and the inner transparency sheet is the same and is one-half the total thickness of transparencies that were determined for the asymmetrical glazing. To form the glazing, the laminate stack is heated, preferably in an autoclave, to cause the interlayer to bind the outer transparency and the inner transparency in the glazing laminate.

Other advantages and features of the presently disclosed invention will become apparent to those skilled in the pertinent art as a presently preferred embodiment of the disclosed invention proceeds.

BRIEF DESCRIPTION OF THE DRAWINGS

A presently preferred embodiment of the disclosed invention is shown and described in connection with the accompanying drawings in which.

DESCRIPTION OF A PRESENTLY PREFERRED EMBODIMENT

Significant aspects of sound attenuation in symmetric and asymmetric automotive glazings are discussed in "Practical Design Considerations for Lightweight Windshield Application" published Feb. 28, 2017 and filed by Applicant as U.S. Provisional Application 62/448,657 which document is hereby specifically incorporated herein by reference in its entirety.

The presently disclosed invention concerns sound attenuation in connection with symmetrical glazings, especially in non-forward facing automotive glazings. The emphasis on weight reduction of automotive vehicles has tended to support the use of asymmetric glazings, especially in windshields and other forward-facing glazings. Weight reduction in asymmetric glazings sometimes results in an extreme degree of asymmetry—that is the thickness of inner transparency is much less that the thickness of the outer transparency in comparison to inner and outer transparencies of prior art asymmetric glazings.

It has been stated that sound attenuation in asymmetric glazings is not significantly different than sound attenuation in symmetric glazings of comparable weight. Such assumptions tend to support extending the use of asymmetric glazings to automotive sidelights and backlights. However, cost and other factors may counterbalance such tendencies. For example, thinner inner transparency sheets for asymmetric glazings have been considered down to thicknesses of 0.7 mm. However, compared to a more conventional glass thickness of 1.4 mm, 0.7 mm glass requires a more expensive raw material and involves more process steps to manufacture. Specifically, 1.4 mm glass can be strengthened by thermal tempering whereas 0.7 mm glass generally uses more costly aluminosilicate glass (as opposed to soda-lime silicate glass) and is strengthened through an ion-exchange process rather than thermal tempering. Such differences in source material and processing steps may result in significantly higher manufacturing costs.

Figure 1:
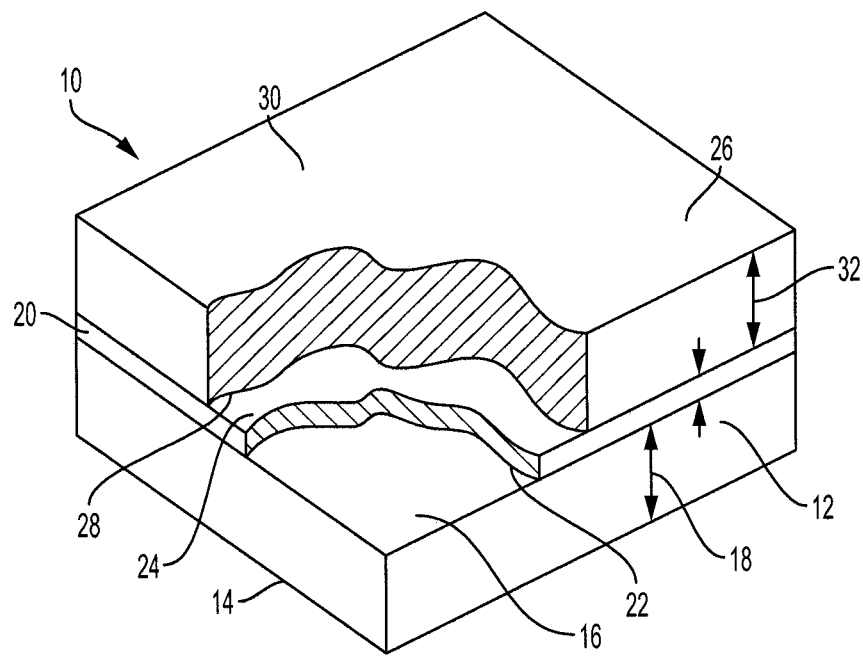
FIG. 1 is a top perspective view of a section of a symmetric glazing with portions thereof broken away to better disclose the structure thereof.

FIG. 1 shows a symmetric glazing 10 of the type used in some automotive glazings. Symmetric glazing 10 includes an outer transparency sheet 12 that defines a first surface 14 and a second surface 16 that is oppositely disposed on sheet 12 from first surface 14. First surface 14 and second surface 16 are separated from each other by a thickness dimension 18 that is oriented orthogonally to each of first surface 14 and second surface 16.

Symmetric glazing 10 further includes and an interlayer 20 that defines a layer of polymer material having a first surface 22 and a second surface 24 that is oppositely disposed on said polymer layer from first surface 22. The first surface 22 of interlayer 20 is opposed to the second surface of 16 of outer transparency sheet 12.

Symmetric glazing 10 further includes an inner transparency sheet 26 that defines a first surface 28 and a second surface 30 that is oppositely disposed on sheet 26 from first surface 28. First surface 28 and second surface 30 are separated from each other by a thickness dimension 32 that is oriented orthogonally to each of first surface 28 and second surface 30. Symmetrical glazing 10 is "symmetrical" in that thickness 18 of outer transparency 12 is nominally the same as thickness 32 of inner transparency sheet 26.

Figure 2:
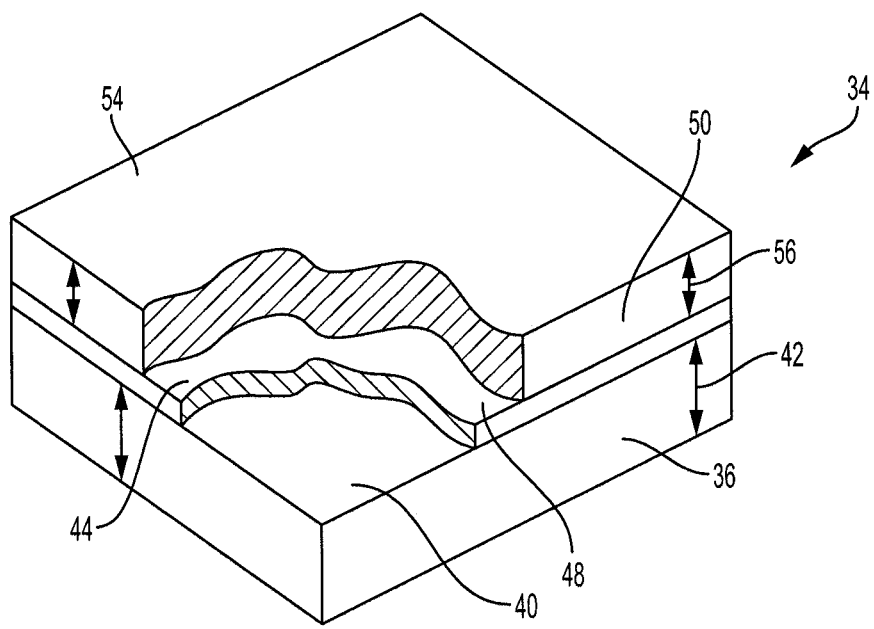
FIG. 2 is a top perspective view of a section of an embodiment of the asymmetric glazing with portions thereof broken away to better disclose the structure thereof.
Figure 3:
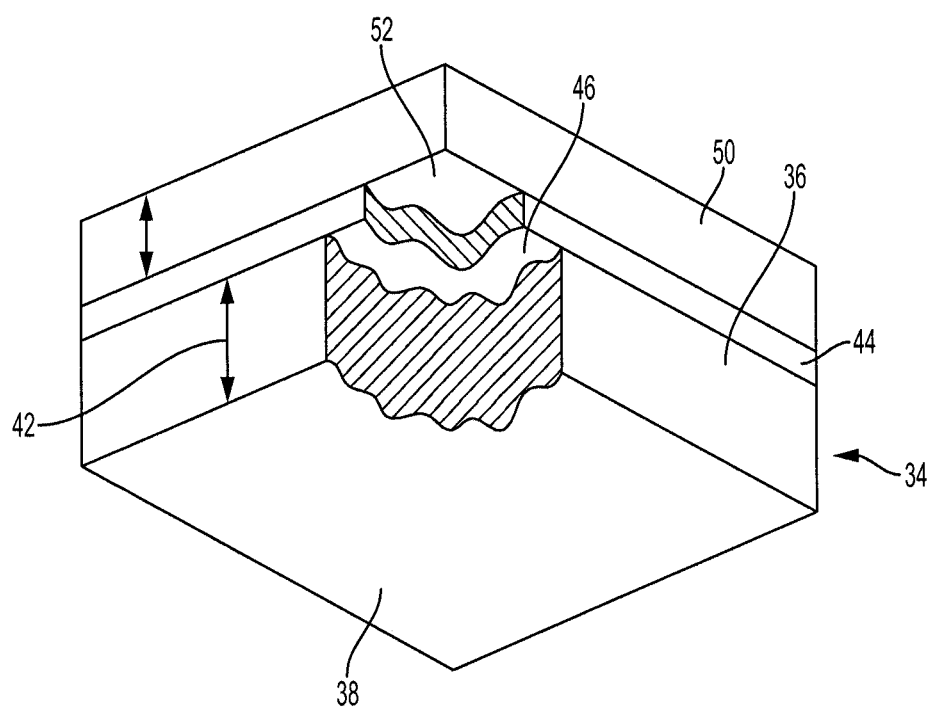
FIG. 3 is a bottom perspective view of the section of the asymmetric glazing shown in FIG. 2 with portions thereof broken away to better disclose the structure thereof.

FIGS. 2 and 3 show top and bottom perspective views of an asymmetric glazing laminate 34. Much of the structure of asymmetric glazing laminate 34 is similar to the structure of symmetric glazing laminate 10, but there are also important differences.

As shown in FIGS. 2 and 3, asymmetric glazing 34 includes an outer transparency sheet 36 that defines a first surface 38 and a second surface 40 that is oppositely disposed on sheet 36 from first surface 38. First surface 38 and second surface 40 are separated from each other by a thickness dimension 42 that is oriented orthogonally to each of first surface 38 and second surface 40.

Asymmetrical glazing 34 further includes an interlayer 44 that defines a layer of polymer material having a first surface 46 and a second surface 48 that is oppositely disposed on said polymer layer from first surface 46. First surface 46 of interlayer 44 is opposed to the second surface of 40 of outer transparency sheet 36.

Asymmetric glazing 34 further includes an inner transparency sheet 50 that defines a first surface 52 and a second surface 54 that is oppositely disposed on sheet 50 from first surface 52. First surface 52 and second surface 54 are separated from each other by a thickness dimension 56 that is oriented orthogonally to each of first surface 52 and second surface 54. Asymmetric glazing 34 is "asymmetrical" in that thickness 42 of outer transparency 36 is greater than the thickness 56 of inner transparency sheet 50.

Interlayer 20 of symmetric glazing 10 and interlayer 44 of asymmetric glazing 34 may be a polymer material such as ethylene vinyl acetate, polyvinyl butyral, polyethane, polycarbonate, polyethylene terephthalates, and combinations thereof. Interlayers 20 and 44 bond the outer transparency sheet with the inner transparency sheet in the respective symmetric and asymmetric glazings 10 and 34 in accordance with autoclave processes that are known in the art. Following the autoclave process, the thickness of interlayer 20 or 44 may be in the range of 0.71 mm to 0.81 mm.

Human auditory recognition normally occurs for sounds in the range of about 20 Hz to about 20,000 Hz, but humans are generally most sensitive to sound in the range of about 2,000 Hz to about 5,000 Hz. In connection with the presently disclosed invention, sound attenuation performance of symmetric and asymmetric glazings in the frequency range of 50 to 8,000 Hz are closely approximate except in the frequency range of about 2,500 to 8,000 Hz. In the 2,500 to 8,000 Hz range, asymmetric glazings exhibit a resonance condition (also herein "coincidence dip") that is more pronounced (i.e. greater magnitude) than the coincidence dip in symmetric glazings of equivalent weight. For example, a symmetric glazing with a 1.4 mm outer transparency (i.e. the transparency that is exposed to external conditions) and a 1.4 mm inner transparency (i.e. the transparency exposed to the passenger compartment) has a weight that is equivalent to an asymmetric glazing with a 2.1 mm outer transparency and a 0.7 mm inner transparency. However, the coincidence dip of the symmetric glazing is more muted than the coincidence dip of the asymmetric glazing.

It is believed that the "coincidence dip" is due to vibration frequency of the material matching the vibration frequency of the incident sound pressure waves. Frequencies that produce coincidence conditions in the glazing may be generally referred to as "coincidence frequencies." At certain coincidence frequencies, sound waves that impact the outer transparency cause a glazing to resonate and enhance sound transmission from the glazing to the passenger compartment. Accordingly, sound attenuation is enhanced by damping coincidence frequencies, particularly frequencies in the 2,000 Hz to 5,000 Hz range where humans have higher sensitivity.

In accordance with the disclosed method, different glazings may have different coincidence frequencies depending on the thickness ratio of the inner transparency vs. the outer transparency. The presently disclosed method exploits the relationship between coincidence frequencies and the transparency thickness ratios in combination with lightweighting of automotive glazings to produce lightweight glazings with a reduced coincidence dip.

Figure 4:
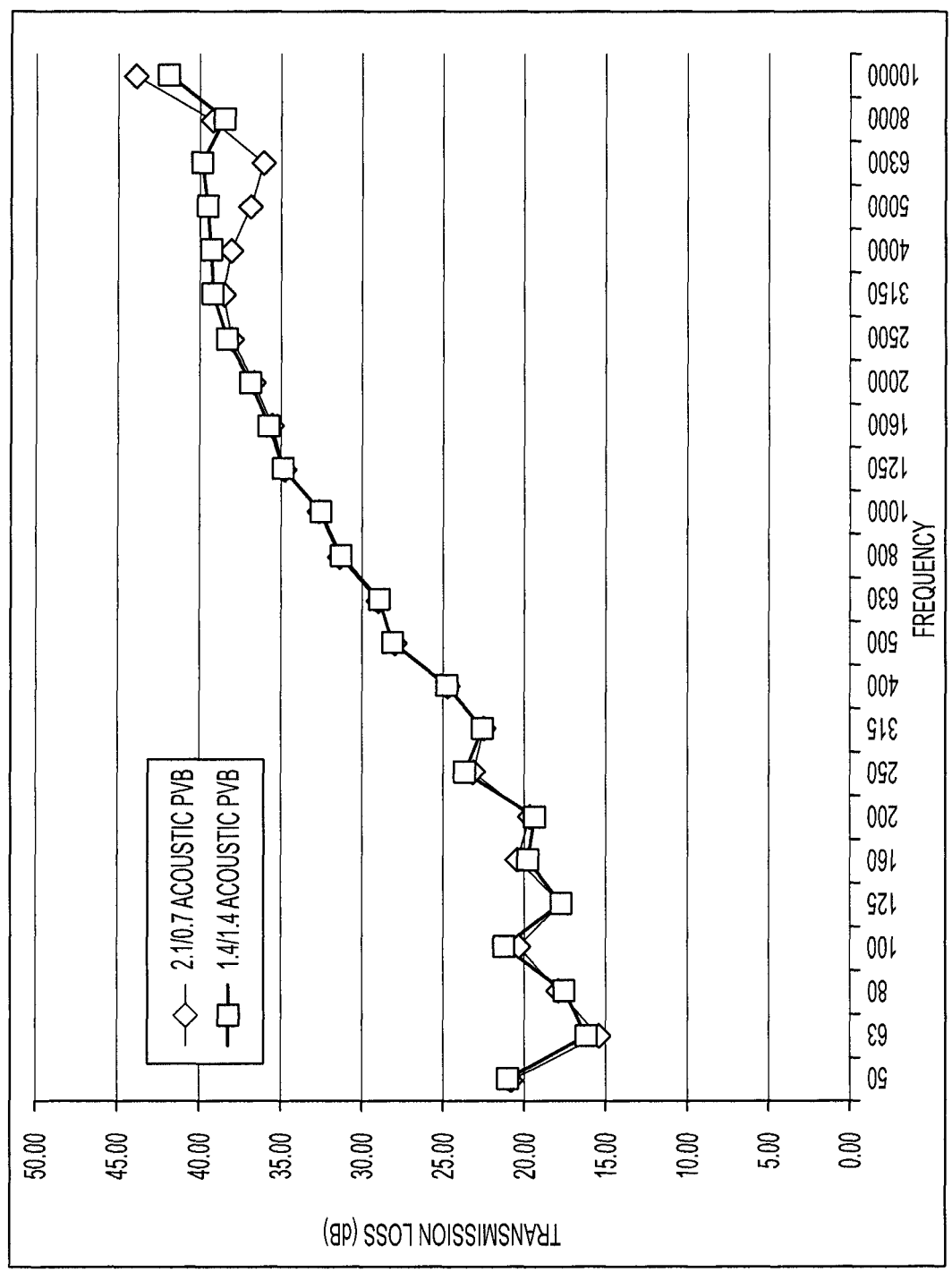
FIG. 4 is a graph showing sound attenuation of asymmetric and asymmetric glazings over a frequency range of 50 Hz to 10,000 Hz.

FIG. 4 is a graph that shows the "coincidence dip" of an asymmetric glazing having a 2.1 mm outer transparency layer and a 0.7 mm inner transparency layer. FIG. 4 also shows the "coincidence dip" of a symmetric glazing having a 1.4 mm outer transparency layer and a 1.4 mm inner transparency layer. The symmetric glazing has the same weight per unit area of the glazing as the asymmetric glazing. The asymmetric glazing has a coincidence dip in the range of about 2,500 Hz to about 8,000 Hz. The symmetric glazing also has a coincidence dip, but it is less pronounced than for the asymmetric glazing and, importantly, the symmetric glazing coincidence dip occurs at frequencies above 6,300 Hz.—out of the range of highest sensitivity for most humans.

Comparison of the respective line graphs in FIG. 4 shows that a 1.4 mm/1.4 mm symmetric glazing produces the same weight reduction as a 2.1 mm/0.7 mm asymmetric glazing, but that the symmetric glazing has important advantages in sound attenuation. In the frequency range of highest human sensitivity, the symmetric glazing has approximately 5 dB greater sound attenuation in comparison to the asymmetric glazing.

In addition, from the standpoint of cost, the symmetric glazing has important advantages over the asymmetric glazing. The symmetric glazing uses 1.4 mm glass in both the inner and outer transparencies. Compared to 1.4 mm glass, the 0.7 mm glass that is used in the asymmetric glazing requires a more expensive raw material and involves more process steps than 1.4 mm glass. Specifically, 1.4 mm glass can be strengthened by thermal tempering whereas 0.7 mm glass generally uses aluminosilicate glass (as opposed to less costly soda-lime silicate glass) that is strengthened through an ion-exchange process (as opposed to a less costly thermal tempering process). Thus, in comparison to the asymmetric glazing, the symmetric glazing reduces costs by avoiding the need for relatively costly glass and for more complicated strengthening processes.

The disclosed invention includes a process for realizing improved sound attenuation advantages as well as other advantages of symmetrical glazings relative to highly asymmetrical glazings while maintaining the benefits of weight reduction. In a first step, a preferred asymmetric glazing is determined. Selection of the preferred thicknesses of the inner and outer transparencies of the asymmetric glazing is made according to factors that are known in the art. Such factors include requirements for overall glazing strength, glazing rigidity, stone impact resistance, and combinations thereof.

After the asymmetric glazing design is selected, the total transparency thickness of the asymmetric glazing is determined. That may be done by simply adding the thickness of the outer transparency to the thickness of the inner transparency.

Next, an interlayer made of a polymer material is placed between an outer transparency sheet and an inner transparency sheet to form a laminate stack. Each of the outer transparency sheets and the inner transparency sheets in the laminate stack has the same thickness which is determined as one-half the total transparency thickness of the asymmetric glazing.

Thereafter, the laminate stack is heated in an autoclave or other heat process to cause the interlayer to bond the outer transparency and the inner transparency into a symmetric glazing.

Through this process, a symmetric glazing is produced that has the reduced weight of the asymmetric glazing design and also the benefit of higher sound attenuation in the range of high human sensitivity.

We claim:

1. A process for making a lightweight symmetric glazing that has a lower cost and greater sound attenuation at a coincidence dip in comparison to asymmetric glazings having one transparency layer of aluminosilicate glass and another transparency layer of soda-lime silicate glass, said process comprising the steps of:
(a) selecting an asymmetric glazing have a first outer transparency layer of soda-lime silicate glass, a first inner transparency layer of aluminosilicate glass, and a first interlayer for bonding said first outer transparency layer and said first inner transparency layer, wherein the thickness of said first outer transparency layer is greater than the thickness of the first inner transparency layer; (b) determining the total transparency thickness of the asymmetric glazing by adding the thickness of the first outer transparency layer of soda-lime silicate glass of the asymmetric glazing to the thickness of the first inner transparency layer of aluminosilicate glass of the asymmetric glazing; and
(c) making the lightweight symmetric glazing by
(1) arranging a sheet of polymer material between a first transparency sheet of soda-lime silicate glass that has a thickness that is one-half of said total transparency thickness of the asymmetric glazing and a second transparency sheet of soda-lime silicate glass that also has a thickness that is one-half of said total transparency thickness of the asymmetric glazing, said first transparency sheet of soda-lime silicate glass, said sheet of polymer material, and said second transparency sheet of soda-lime silicate glass forming a symmetric laminate stack; and
(2) heating the symmetric laminate stack to cause said sheet of polymer material to bond to said first transparency sheet of soda-lime silicate glass and to cause said sheet of polymer material to bond to said second transparency sheet of soda-lime silicate glass to form said lightweight symmetric glazing wherein said lightweight symmetric glazing has a coincidence dip that has a greater sound attenuation that the sound attenuation in the coincidence dip of the asymmetric glazing, and wherein the cost of the first transparency sheet of soda-lime silicate glass in combination with the cost of second transparency sheet of soda-lime silicate glass in the lightweight symmetric glazing in less that the cost of the first outer transparency layer of soda-lime silicate glass in combination with the cost of the first inner transparency layer of aluminosilicate glass of the asymmetric glazing.

2. The process of claim 1 wherein said step of heating the symmetric laminate stack is performed in an autoclave and wherein the coincidence dip of the lightweight symmetric glazing occurs over a lower frequency range than the frequency range of the coincidence dip of the asymmetric glazing.

\* \* \* \* \*